(12) United States Patent
Patenaude (10) Patent No.: US 7,474,942 B2
(45) Date of Patent: Jan. 6, 2009

(54) METHOD AND SYSTEM FOR MODIFYING A WAKE UP MODE OF A TELEMATICS UNIT

(75) Inventor: Russell A. Patenaude, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 597 days.

(21) Appl. No.: 11/110,146

(22) Filed: Apr. 20, 2005

(65) Prior Publication Data

US 2006/0241817 A1    Oct. 26, 2006

(51) Int. Cl.
*G06F 17/00* (2006.01)
(52) U.S. Cl. .............................. 701/1; 701/2
(58) Field of Classification Search ................ 701/1–2, 701/36, 213; 340/425.5, 426
See application file for complete search history.

(56) References Cited

U.S. PATENT DOCUMENTS

| 6,028,537 | A  | 2/2000  | Suman et al. |
| 2003/0185162 | A1 | 10/2003 | Fraser et al. |
| 2004/0203340 | A1 | 10/2004 | Oesterling et al. |

OTHER PUBLICATIONS

U.S. Appl. No. 10/837,935, filed May 3, 2004, Stefan, Jeffrey M. et al.

*Primary Examiner*—Yonel Beaulieu (57) ABSTRACT

A method of enabling vehicle communications includes receiving a mode change trigger at a telematics unit; receiving a signal at the telematics unit responsive to a trigger event; modifying a wake up mode of the telematics unit based on the signal; and energizing the telematics unit based on the modified wake up mode.

18 Claims, 6 Drawing Sheets

METHOD AND SYSTEM FOR MODIFYING A WAKE UP MODE OF A TELEMATICS UNIT

FIELD OF THE INVENTION

The present invention generally relates to enabling communication between a mobile vehicle and a central location.

BACKGROUND OF THE INVENTION

Inclusion of wireless communication systems within mobile vehicles provides an opportunity to communicate between the vehicle and a central location. Vehicle services such as unlocking doors and theft tracking can be enabled using the wireless communication systems.

In order to receive vehicle service communications while the vehicle is not operating, telematics units operate on an intermittent wake up mode, whereby the telematics unit 'wakes up' on a predetermined schedule to determine if another party, such as a call center, is attempting to communicate with the vehicle. Waking up can drain battery power however. When the battery has no power remaining, the telematics unit is unable to receive communications and therefore has a compromised ability to provide the services. Other devices utilize a standby variation while in a digital region, as digital communications require less power consumption. In devices utilizing a standby variation, the telematics unit remains awake for an extended span of time, such as 24 hours, and then enters an extended wake up mode.

The present invention overcomes these disadvantages and advances the state of the art.

SUMMARY OF THE INVENTION

One aspect of the present invention provides a method of enabling vehicle communications including receiving a mode change trigger at a telematics unit and receiving a signal at the telematics unit responsive to a trigger event. The method further includes modifying a wake up mode of the telematics unit based on the signal and energizing the telematics unit based on the modified wake up mode.

One aspect of the present invention provides a computer readable medium including computer readable code for enabling vehicle communications including computer readable code for receiving a mode change trigger at a telematics unit and computer readable code for receiving a signal at the telematics unit responsive to a trigger event. The medium further includes computer readable code for modifying a wake up mode of the telematics unit based on the signal and computer readable code for energizing the telematics unit based on the modified wake up mode.

Another aspect of the present invention provides a system for enabling vehicle communications including means for receiving a mode change trigger at a telematics unit and means for receiving a signal at the telematics unit responsive to a trigger event. The system further includes means for modifying a wake up mode of the telematics unit based on the signal and means for energizing the telematics unit based on the modified wake up mode.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

DETAILED DESCRIPTION OF THE PREFERRED EMBODIMENTS

Figure 1:
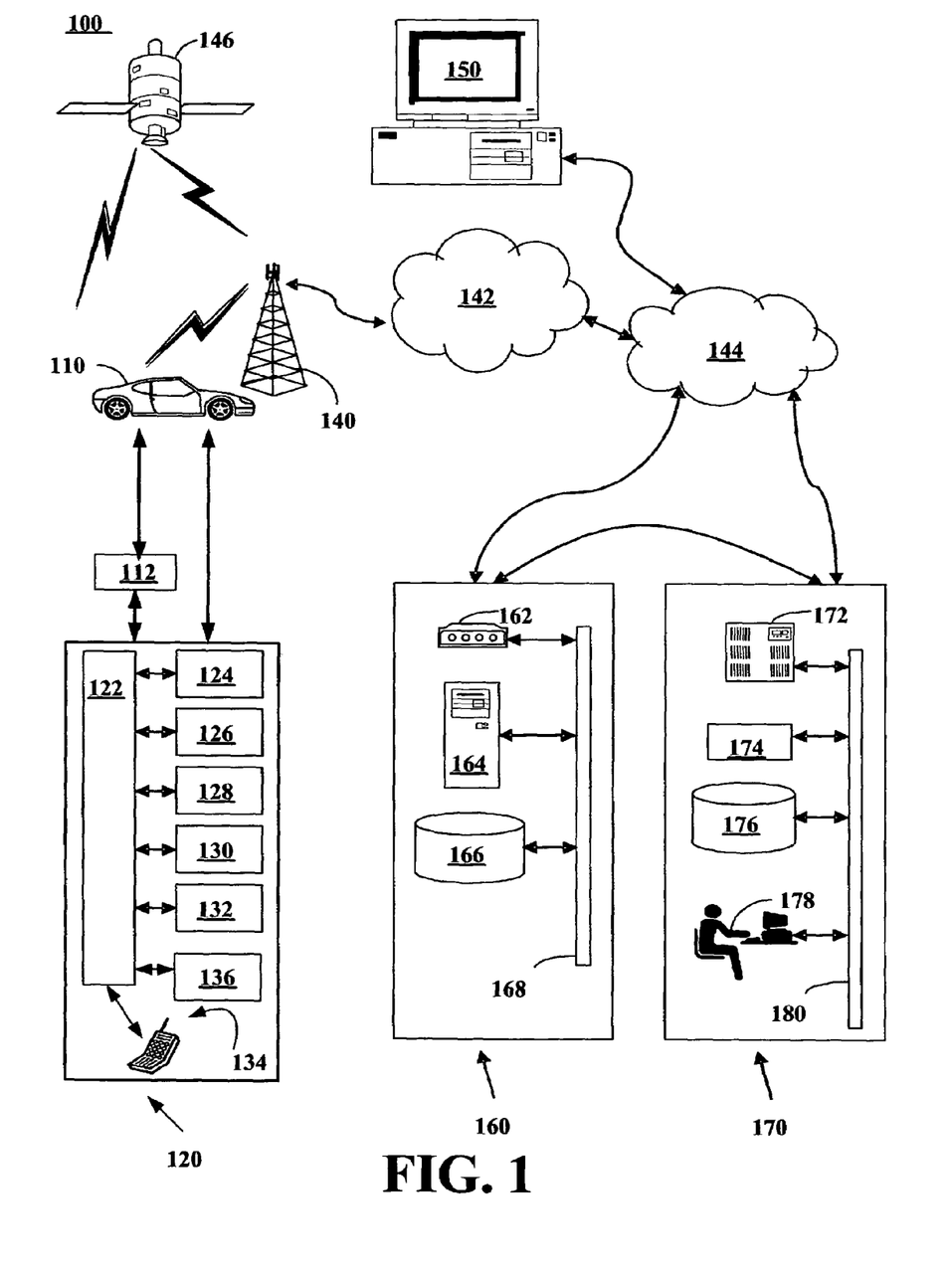
FIG. 1 illustrates an operating environment for a method for establishing communication with a mobile vehicle.

FIG. 1 illustrates an operating environment for a mobile vehicle communication system ("MVCS") 100 for enabling vehicle communication. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. In one embodiment, telematics unit 120 includes a battery power monitor 136 operably connected to a vehicle battery and configured to estimate a battery power level. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. In one embodiment, communication services manager 174 includes at least one digital and/or analog modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
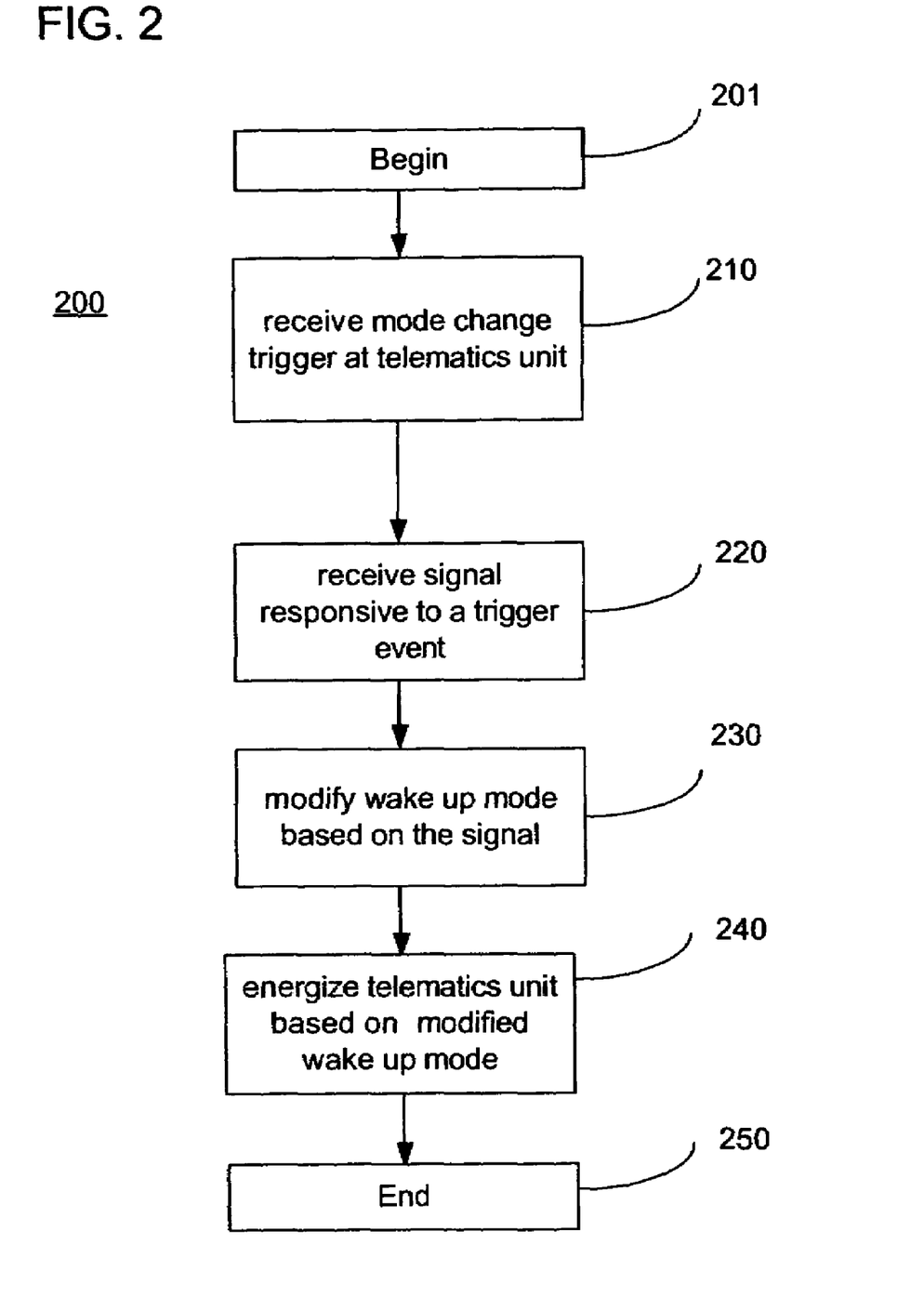
FIG. 2 illustrates one embodiment of a method for enabling vehicle communication in accordance with one aspect of the invention.

FIG. 2 illustrates one embodiment of a method 200 for enabling vehicle communication in accordance with one aspect of the invention. Method 200 begins at step 201.

A mode change trigger is received at a telematics unit at step 210. A mode change trigger defines at least one contingent event that will result in sending a signal to change a mode. In one embodiment, the mode change trigger determines a change in a wake up mode of a telematics unit.

In one embodiment, the mode change trigger is a theft trigger. For example, a broken window signal triggers a mode change. In another example, if the engine is running without proper keys in the ignition, a mode change is triggered. In yet another example, a theft alarm triggers a mode change.

In another embodiment, the mode change trigger is a battery power trigger. In such an embodiment, the telematics unit will change a wake up mode in response to a battery level. For example, in one embodiment, a wake up cycle will be reduced so that the interval between wake up cycles increases when a battery level is low.

In another embodiment, a geographic location serves as a geographic trigger. In one embodiment, a geographic location is determined by a GPS device, such as GPS device 126. A current GPS location is compared to a list of geographic trigger areas, and in the event that the current GPS location matches at least one of the geographic trigger areas, a mode change results. Geographic trigger areas include any location that is intended by an operator either at the telematics unit or at the call center to result in a change in mode. For example, if a particular GPS location is known as a staging area for stolen vehicles, a call center may send that GPS location to all vehicles within a predetermined distance of that staging area to change mode upon arriving at the staging area. In another example, a mode change results from the vehicle arriving at a dealership from a factor, and the vehicle arriving at the GPS location of the dealership triggers a mode change. In one embodiment, entering a geographic region without service coverage or without preferred service coverage triggers a mode change. In such an embodiment, at least one of the telematics unit and the call center acknowledges that the ability to communicate has been degraded.

In another example, a particular political subdivision is known to harbor stolen vehicles, or have a high incidence of vehicle theft, and the activity of a vehicle entering into the political subdivision results in a mode change.

In yet another example, exiting a predetermined GPS region or political subdivision is a trigger to change modes.

In yet another embodiment, a telematics unit within a vehicle dynamically determines a GPS range for its normal operation, and upon exiting the GPS range of normal operation, the mode is changed. A GPS range may be determined, for example, using a convex hull, such as the method described in pending U.S. patent application Ser. No. 10/077, 013 filed Feb. 13, 2002 by Stefan, et. al, and assigned to the assignee of this application, the entirety of which is hereby incorporated by reference. In another example, entering a GPS area known to have poor cellular reception or transmission results in a mode change trigger. In yet another example, entering an area with poor cellular reception results in a mode change trigger.

In another embodiment, the mode change trigger is a usage trigger, dynamically determined in response to vehicle operation. In one embodiment, a vehicle is driven only between Monday and Friday, and only between 8 and 10 AM, and between 5 and 7 PM. Having determined a usage pattern, a usage trigger is determined such that the mode changes during those times, with or without a timing buffer surrounding those usage determinations.

Mode change triggers may be statically determined, or dynamically determined. Mode change triggers may be programmed into a telematics unit at a factory, or may be entered or updated by a user at a telematics unit using a direct or indirect connection to the telematics unit, or by a user at a call center sending a trigger to a single vehicle in the MVCS, all vehicles in the MVCS, all vehicles in the MVCS of a particular brand, model, or model year via a wireless network or a satellite radio subcarrier. For example, a web interface or a voice menu interface are used to trigger a mode change.

A signal is received at the telematics unit in response to a trigger event at step 220. The signal may be received from any appropriate source configured to monitor for events that result in triggers. For example, a signal is received from an ignition monitor, a key fob monitor, a GPS device, a window sensor, an antenna damage sensor, or a cellular reception monitor in various embodiments of the invention. The signal may travel over the vehicle network 112, or be directly transmitted to the telematics unit.

Based on the signal, the wake up mode of the telematics unit is modified at step 230. In one embodiment, a telematics unit has two wake up modes—a normal mode and a modified mode. In one embodiment, the normal mode comprises a ten-minute interval between one-minute wake up periods. In one embodiment, the modified mode comprises a thirty-minute interval between one-minute wake up periods. A wake up mode comprises a predetermined pattern of availability of the telematics unit.

The telematics unit is energized based on the modified wake up mode at step 240. Energizing the telematics unit, in one embodiment, comprises entering a modified wake up mode and monitoring for a communication signal from a wireless network. For example, monitoring for a communication signal comprises 'listening' for a communication request over a wireless network. In another embodiment, energizing the telematics unit comprises providing the telematics unit with a power source to turn the telematics unit on. Method 200 ends at 250.

Figure 3:
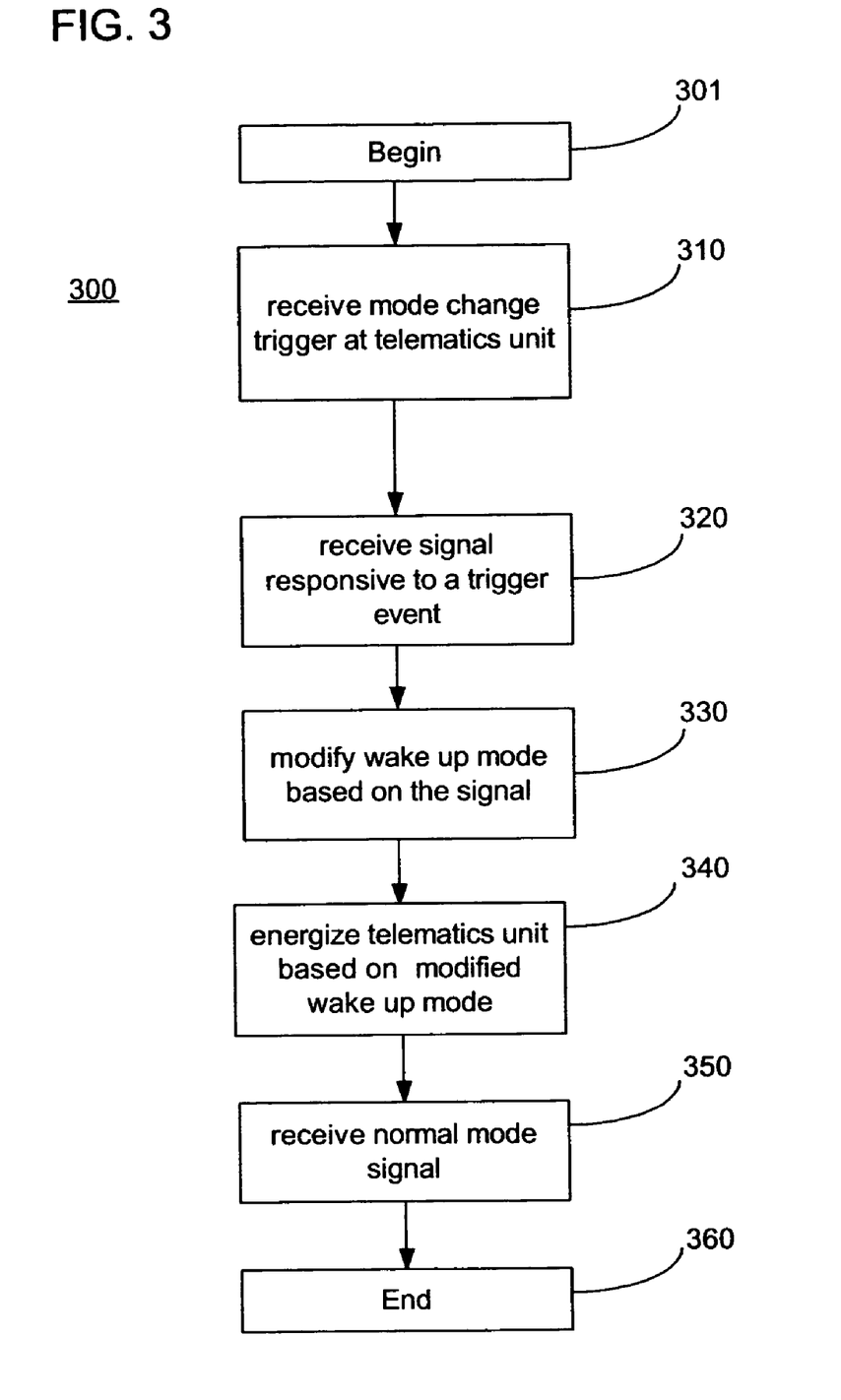
FIG. 3 illustrates another embodiment of a method for enabling vehicle communication in accordance with one aspect of the invention.

FIG. 3 illustrates another embodiment of a method 300 for enabling vehicle communication in accordance with one aspect of the invention. Method 300 begins at step 301.

A mode change trigger is received at a telematics unit at step 310. In one embodiment, step 310 is implemented as step 210.

A signal is received at the telematics unit in response to a trigger event at step 320. In one embodiment, step 320 is implemented as step 220.

Based on the signal, the wake up mode of the telematics unit is modified at step 330. In one embodiment, step 330 is implemented as step 230.

The telematics unit is energized based on the modified wake up mode at step 340. In one embodiment, step 340 is implemented as step 240.

A normal mode signal is received at the telematics unit at step 350. A normal mode signal is a trigger to resume a normal mode, such as a normal wake up mode. A normal mode signal, in one embodiment, is sent from the same device that sent the mode change signal. In another embodiment, the normal mode signal is received at the telematics unit 120 via a wireless connection with the call center 170. Method 300 ends at 360.

Figure 4:
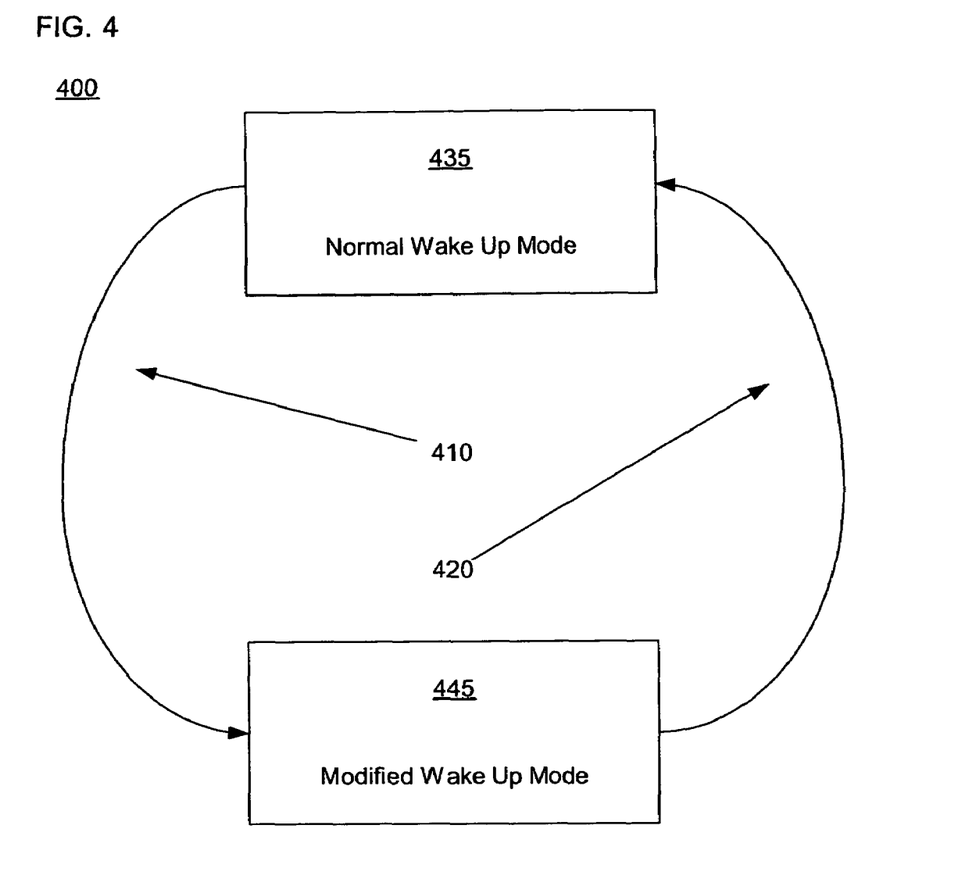
FIG. 4 illustrates a schematic diagram of one embodiment of a method for alternating between a normal wake up mode and a modified wake up mode in accordance with one aspect of the invention.

FIG. 4 illustrates a schematic diagram 400 of one embodiment of a method for alternating between a normal wake up mode and a modified wake up mode in accordance with one aspect of the invention. Modified mode signal 410 switches the mode from normal wake up mode 435 to modified wake up mode 445. Conversely, normal mode signal 420 switches the mode from modified wake up mode 445 to normal wake up mode 435.

Figure 5:
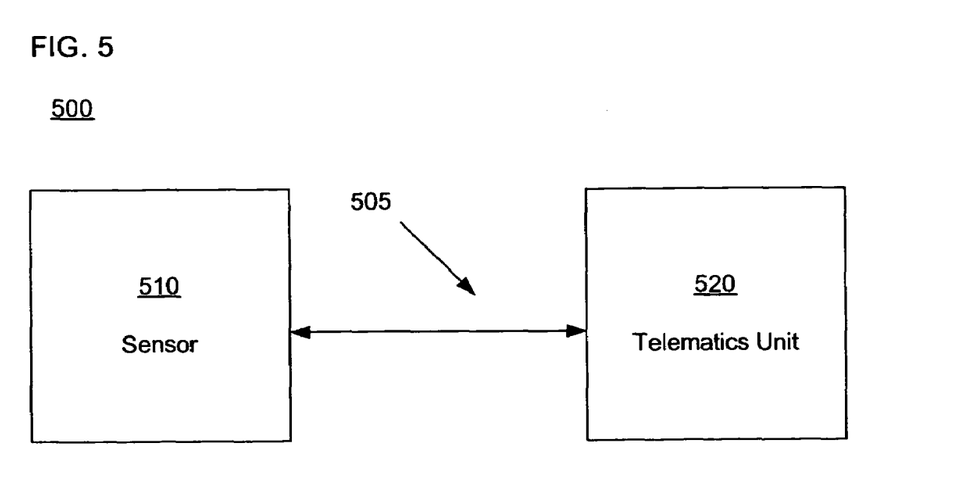
FIG. 5 illustrates one embodiment of a signal between a sensor and a telematics unit in accordance with one aspect of the invention.

FIG. 5 illustrates a signal 505 between a sensor 510 and telematics unit 520. In one embodiment, telematics unit 520 is implemented as telematics unit 120. Signal 505 may be a modified mode signal or a normal mode signal. Sensor 510 is any sensor configured to detect a trigger event, such as an ignition sensor or monitor. In other embodiments, sensor 510 is a GPS unit, such as GPS unit 126, a key fob sensor, a theft alarm, window sensor, door ajar sensor, antenna damage sensor, cellular reception sensor or the like.

Figure 6:
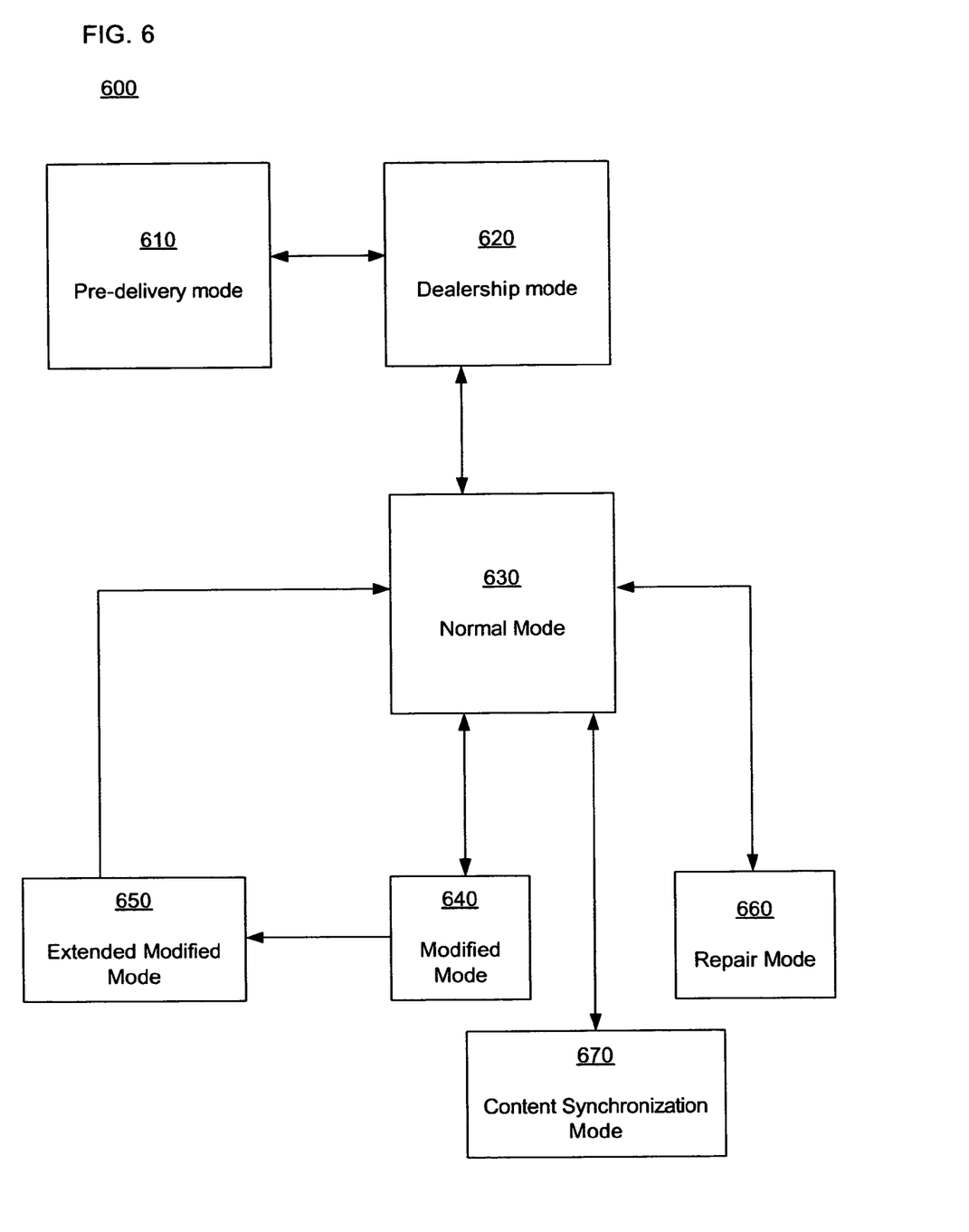
FIG. 6 illustrates one embodiment of a telematics unit alternating between a plurality of modes in accordance with another aspect of the invention.

In yet another embodiment, the telematics unit includes more than two wake up modes. For example, FIG. 6 illustrates a schematic diagram of a telematics unit switching between a plurality of modes at 600 in accordance with one embodiment of the invention. In this embodiment, the telematics unit includes a pre-delivery mode 610 applicable while the vehicle is in transit between a factory and a dealership, during which the telematics unit wakes up for one minute on a four-hour interval. The telematics unit further includes a dealership mode 620 during which the telematics unit wakes up for one minute on a two-hour interval. The telematics unit features a normal mode 630 and a modified mode 640, as described above. The telematics unit, in one embodiment, further includes an extended modified mode 650, during which the telematics unit wakes up for one minute on a 24-hour interval, entered after two weeks of functioning in a modified mode. As shown in FIG. 6, the telematics unit is configured to switch between the extended modified mode 650 to the normal mode 630, although other embodiments allow the telematics unit to alternate between an extended modified mode 650 and a modified mode 640. FIG. 6 also illustrates the telematics unit switching between normal mode 630 and repair mode 660. In one embodiment, a repair mode 660 comprises a wake up mode of one minute on a 2-minute interval.

In one embodiment, the telematics unit is triggered to change modes via a notification transmitted over a satellite radio transmission received by a satellite radio receiver in communication with the telematics unit. Such a notification may be sent using a batch file for multiple telematics units, or the notification may apply to a single, specified vehicle. For example, an automated enrollment process may occur while the telematics unit is in its pre-delivery mode.

In the embodiment illustrated in FIG. 6, the action of changing between modes is the result of receiving a signal at the telematics mode responsive to a trigger event. For example, when switching between a pre-delivery mode 610 and dealership mode 620, the switch occurs, in one embodiment, in response to a GPS unit determining that the vehicle is within a GPS location predetermined to be the dealership. In another embodiment, switching between normal mode 630 and repair mode 660 is the result of a signal from an outside source communicated to the telematics unit via a wireless network, a repair harness, or over a wireless communication using a protocol under FCC Part 15, such as an 802.11 communication.

In yet another embodiment, the telematics unit is triggered to switch between a normal mode and a content synchronization mode 670. A content synchronization mode is entered to synchronize download of content to, for example, a media device in a fashion linked to another event, such as a wake up cycle.

Figure 7:
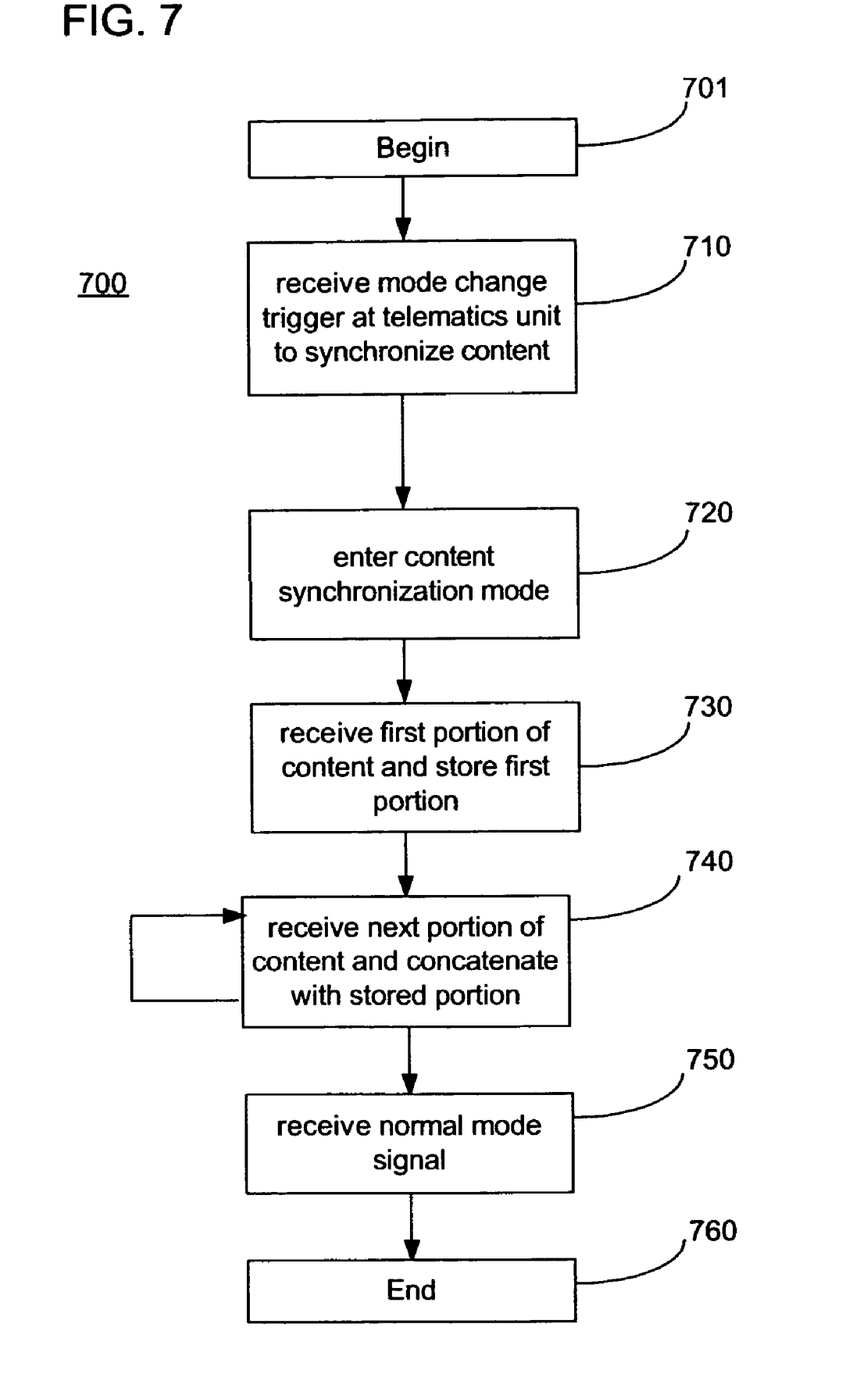
FIG. 7 illustrates one embodiment of a method for entering a content synchronization mode in accordance with one aspect of the invention.

FIG. 7 illustrates one embodiment of a method 700 for synchronizing content with a wake up cycle. Method 700 begins at 701.

A mode change trigger to synchronize content is received at step 710. The mode change trigger, in one embodiment, results from a content request issued by a user for a desired content, such as a musical, dramatic, or other entertainment selection. In one embodiment, the request for the content is a recurring request for episodic content, such as a new episode of a particular television show. In another embodiment, the request is for low priority content such that a user does not desire to obtain the content at a particular time and, in one embodiment, take advantage of potentially lower transmission or acquisition costs at 'off-hours.' Thus, for example, a daily soap opera is requested, and the content synchronization mode is entered to daily obtain the requested soap opera episode.

In one embodiment, the mode change trigger is set to trigger content acquisition during the first wake up cycle following a predetermined event, such as a particular hour of the day, or a time span following the last ignition cycle. The schedule may be set by a user, or determined by the telematics unit dynamically.

In response to the mode change trigger, telematics unit 120 enters the content synchronization mode at 720. For example, a user may specify that the content acquisition is to begin at 1:00 AM, and in response, the telematics unit will enter the content synchronization mode during the first wake up cycle after 1:00 AM. In another example, a user may specify that the content is to be acquired before 7:00 AM. In such an example, the telematics unit may determine the span of time that the content will take to acquire (based on transmission speeds and file size) and "work backwards" to determine an optimal time to initiate content acquisition such that the content will be acquired prior to the desired time. In another example, the telematics unit A first portion of the desired content is received at the telematics unit and stored using a storage device in communication with the telematics unit at 730. The portion of the content may be configured in any fashion known to those of skill in the content transfer arts, and for example, the first portion may be a guide to a table of contents, a number of connections to make or expect, or other such content. In one embodiment, the content is divided into portions that are sized to be transmitted within a single wake up cycle aligned with the content synchronization mode. In one embodiment, the content is portioned by communication services managers 174.

A next portion of the content is received at 740. The next portion is concatenated with the stored portion, and step 740 repeats until the entire content is received.

After the entire content is received, the telematics unit receives a normal mode signal at 750. In one embodiment, the normal mode signal is received from the storage device indicating that the entire content has been received. Method 700 ends at 760.

The present invention may be embodied in other specific forms without departing from the spirit or essential characteristics. The described embodiments are to be considered in all respects only as illustrative and not restrictive. Those of ordinary skill in the art will readily recognize that specific time intervals or time spans other than those that are mentioned herein are contemplated, and would be able to implement such an alternate implementation without undue experimentation.

What is claimed is:

1. A method of enabling vehicle communications, the method comprising:

receiving a mode change trigger at a telematics unit associated with the vehicle;

receiving a signal at the telematics unit responsive to a trigger event, wherein the signal is received from a source selected from the group consisting of an ignition monitor, a key fob monitor, a GPS device, a window sensor, a cellular reception monitor, a motion sensor, and an antenna damage sensor;

modifying a wake up mode of the telematics unit based on the received signal; and energizing the telematics unit based on the modified wake up mode.

2. The method of claim 1, further comprising receiving a normal mode signal at the telematics unit.

3. The method of claim 1, wherein energizing the telematics unit based on the modified wake up mode comprises entering a modified wake up mode and monitoring for a communication signal from a wireless network.

4. The method of claim 1, wherein a wake up mode comprises a predetermined pattern of availability of the telematics unit.

5. The method of claim 4 wherein the modified wake up mode comprises an interval of 30 minutes between availability of the telematics unit, and wherein a normal wake up mode comprises an interval of 10 minutes between availability of the telematics unit.

6. The method of claim 1 wherein the modified wake up mode is a content synchronization mode.

7. The method of claim 1 wherein the modified wake up mode is a pre-delivery mode.

8. The method of claim 1 further comprising entering an extended modified mode from the modified wake up mode.

9. A method of enabling vehicle communications, the method comprising:
   receiving at a telematics unit associated with the vehicle a mode change trigger selected from the group consisting of a theft trigger, battery power trigger, a geographic trigger, content synchronization trigger, and a usage trigger;
   receiving a signal at the telematics unit responsive to a trigger event;
   modifying a wake up mode of the telematics unit based on the signal; and
   energizing the telematics unit based on the modified wake up mode.

10. The method of claim 9, further comprising computer readable code for receiving a normal mode signal at the telematics unit.

11. The method of claim 9, wherein the mode change trigger is selected from the group consisting of a theft trigger, a geographic trigger, and a usage trigger.

12. The method of claim 9, wherein the signal is received from a source selected from the group consisting of an ignition monitor, a key fob monitor, a GPS device, a window sensor, a cellular reception monitor, and antenna damage sensor.

13. The method of claim 9, wherein computer readable code for energizing the telematics unit based on the modified wake up mode comprises computer readable code for entering a modified wake up mode and computer readable code for monitoring for a communication signal from a wireless network.

14. The method of claim 9, wherein a wake up mode comprises a predetermined pattern of availability of the telematics unit.

15. The method of claim 14 wherein the modified wake up mode comprises an interval of 30 minutes between availability of the telematics unit, and wherein a normal wake up mode comprises an interval of 10 minutes between availability of the telematics unit.

16. The method of claim 9 wherein the wake up mode is selected from the group consisting of a content acquisition mode, a pre-delivery mode, and a repair mode.

17. The method of claim 9 further comprising computer readable code for entering an extended modified mode from the modified wake up mode.

18. A system for establishing communication with a vehicle, the system comprising:
   means for receiving a mode change trigger at a telematics unit;
   means for receiving a signal at the telematics unit responsive to a trigger event;
   means for modifying a wake up mode of the telematics unit based on the signal; and
   means for energizing the telematics unit based on the modified wake up mode.

* * * * *